Patented Jan. 11, 1944

2,338,772

UNITED STATES PATENT OFFICE 2,338,772

STABILIZATION OF TERPENE PRODUCTS

Eugene J. Lorand, Wilmington, Del., assignor to Hercules Powder Company, Wilmington, Del., a corporation of Delaware No Drawing. Application October 2, 1941, Serial No. 413,325

13 Claims. (Cl. 260—631.5)

This invention relates to a method for treating oxidized terpene compounds and more particularly it relates to a method for rendering stable oxidized terpene compounds which tend to undergo spontaneous exothermic reactions.

In the processing of terpene hydrocarbon fractions and especially in the chemical conversion of such materials to terpene alcohols there are obtained by-products which chiefly comprise monocyclic terpene hydrocarbons of limited usefulness. It has recently been found that such by-products can be converted to much more useful products by oxidation as with atmospheric oxygen. However, oxidation is accomplished by the formation of highly unstable materials. These unstable components of the oxidized terpenes tend to undergo spontaneous exothermic reactions upon warming and in some cases a dangerously violent reaction ensues. Their presence has prevented safe practical use of the oxidized terpenes.

Now in accordance with this invention it has been found that by heating unstable oxidized terpenes while controlling their temperature within certain limits, the unstable components can be eliminated. The treatment preferably but not necessarily is carried out in the presence of an oxidizable terpenic compound, permitting reaction therewith, as a means of obtaining smoother operation and easier control of the temperature during stabilization. The treatment may thus comprise mixing such a terpenic compound with the unstable oxidized terpene and warming the mixture while preventing excessive rise in temperature until unstable components have been reduced to a safe proportion.

The method in accordance with this invention is applicable to any oxidized terpene or terpene mixture which is characterized by instability of the type which leads to spontaneous exothermic reaction entirely within the material itself. Instability of this nature is readily determined by heating a small quantity of material to a temperature of 120° C. and noting whether appreciable evolution of gas occurs or whether a sharp temperature rise indicating an exothermic reaction occurs at the said temperature or during heating to the said temperature. The method in accordance with this invention is particularly directed to unstable products of this nature which are derived by oxidation with pure or diluted oxygen gas, for example, with air, of monocyclic terpene hydrocarbon fractions with a boiling point or boiling range between about 170° C. and about 195° C. Such fractions will usually contain one or more compounds of the group represented by dipentene, limonene, alpha-terpinene, beta-terpinene, terpinolene, 1-4 cineol, 1-8 cineol, and the like. The process is especially valuable in the treatment of fractions containing appreciable portions of terpinolene since it has been found that terpinolene is outstanding among terpenes in its ease of oxidation by gaseous oxygen and also in its tendency to form unstable compounds.

Typical unstable oxidized terpene compounds are those obtained by air-oxidation at, for example, a temperature between about 0 and about 85° C. and especially at temperatures between about 30 and about 60° C. of such commercial terpene cuts as those known as "Solvenol" and "Bysol." These materials contain in variable quantities the particular terpenes hereinabove mentioned. Bysol is characterized by a content of terpinolene which is above about 25%. The product formed by air-oxidation of terpenes or terpene fractions of this nature will, in typical cases, comprise about 15 to about 30% of water-soluble material of an oxygenated terpene character, about 40 to about 65% of a steam distillable fraction consisting mainly of terpene hydrocarbons having boiling points above about 170° C., and about 20 to about 50% of steam distillation residue which is a viscous liquid or semiliquid relatively rich in oxygen and comprises polymeric terpenic compounds.

The oxidizable terpenic material which is preferably present in stabilizing the unstable oxidized terpenes will be characterized by at least one double bond capable of undergoing an oxidation reaction. Most conveniently it will be provided in the form of unoxidized terpenes or terpene mixtures of the type which have been oxidized for the unstable product. In this manner the unoxidized terpenes added or present are in part at least converted to products very similar to the oxidized terpenes in stable form. However, such terpene hydrocarbons as, for example, terpinolene, alpha-, beta-, gamma-terpinene, dipentene, limonene, alpha- and beta-phellandrene, sabinene, pyronenes, menthenes, and the like in pure form or in the form of commercial terpene cuts rich therein are suitable for the purpose.

The quantity of unsaturated terpene added may vary from a very small amount to a quantity as high as an amount equal to the unstable oxidized material. Best practice calls for a quantity at least sufficient to react with unstable components in substantial elimination or reduction of such components to safe proportions.

Usually between about 1/10 and 1/2 of the quantity of the unstable oxidized terpenes insures readiest stabilization.

A convenient procedure comprises mixing the unstable material and an unsaturated terpene in the cold and heating the mixture gradually to a temperature between about 90° C. and about 140° C. preferably between about 100° C. and about 120° C. It is desirable to provide means for rapid cooling and to maintain good temperature control by vigorous agitation and manipulation of the heating and cooling means so that the temperature of the reacting material can be held within the ranges mentioned. It is desirable to apply cooling whenever during the heating period a sharp rise in temperature begins to take place. The most desirable procedure comprises controlled very gradual heating to the range mentioned and maintenance of the temperature within the range until components capable of spontaneous exothermic reaction have been substantially eliminated.

It is to be noted that in many cases strong evolution of heat occurs and safe operation requires caution in the heating of large portions of material. A safe and convenient procedure involves heating and relatively small quantity of unstable material and unsaturated terpene to the stabilizing temperature range and slowly adding additional unstable material with or without additional unsaturated terpene utilizing the heat formed to maintain the mixture at the desired temperature and discontinuing addition for an interval whenever temperatures rise more rapidly than is desired. Boiling water forms a convenient regulating means since any sudden increase in heat merely causes additional water to boil. This expedient keeps the temperature of a reacting batch near 100° C. Continuous stabilization wherein a mixture of unstable oxidized terpenes and the unsaturated terpene stabilizer are passed through a long coil maintained at the desired temperature by jacketing lends itself to safe and economical operation since good temperature control is assured by the large heat transfer surface available.

In one mode of procedure in accordance with the method of this invention, stabilization is accomplished in the presence of one or more unsaturated terpenes having an oxidizable double bond carried through from the original monocyclic terpene or terpene mixture oxidized. This is accomplished by carrying out the oxidation step, for example, treating the monocyclic terpene or terpene mixture with air or relatively pure oxygen at a temperature between about 0° C. and about 85° C., preferably between 30° C. and 60° C., until an appreciable increase in specific gravity, for example, an increase to above 0.95, and an appreciable increase in the weight of the material treated are obtained, but discontinuing the reaction before the terpenes have become substantially saturated with respect to oxygen. There results in this manner an oxidized terpene mixture containing as usual unstable components in admixture with a hydrocarbon or other terpenic material containing a double bond capable of oxidation. This mixture may then be stabilized in the same manner as though it were prepared by adding the unsaturated stabilizing hydrocarbon to a partially or fully oxidized unstable terpene product.

Where little or no oxidizable terpenic material is added to the unstable oxidized terpene (and little or none is present in the oxidized fraction), it is important to provide sufficient heat absorption means such as cooling surfaces, with respect to the mass treated, to insure control of the temperature. A convenient method of procedure is to heat a small quantity of unstable material, permitting the temperature to rise into the desired range of 90 to 140° C. Additional material is slowly added, usually with cooling, the heat formed serving to maintain the temperature in the range. Addition may be discontinued for a time if the temperature tends to rise unduly. Thus the reaction initiated by warming is permitted to expend itself safely under controlled temperature conditions. After all the material to be stabilized has been added, the temperature is held in the desired range until unstable components have been reduced to a safe quantity.

The method in accordance with this invention stabilizes unstable oxidized terpenes with practically a 100% yield since the unstable materials are converted to useful terpenic derivatives similar in nature to stable components of the mixture. Instability may be tested for by heating a sample above 120° C. and noting whether appreciable gas evolution or an exothermic reaction indicated by a rapid temperature rise occurs. Instability may also be tested by noting the ability of the material to liberate free iodin upon being heated with an acidified alkali metal iodide solution. It is characteristic of unstable products that they liberate iodin under these conditions freely. The stabilized product is incapable of appreciable spontaneous exothermic reaction upon being heated and is also characterized by little or no iodin liberation upon heating with acidified aqueous alkali metal iodides. It will be characterized by an iodin liberation value which does not exceed the equivalent of 1.0% hydrogen peroxide.

The method in accordance with this invention is illustrated by the specific embodiments thereof in the following examples.

*Example 1*

A mixture of monocyclic terpenes having boiling points above 170° C. and formed as a by-product in the hydration of turpentine to tepineol and consisting mainly of terpinolene, terpinenes, dipentene, with some limonene and cineols was oxidized by blowing air therethrough at a temperature maintained at 50° C. until the specific gravity of the mixture at 15.5° C. rose to 1.027. 320 parts of the resulting unstable oxidized product and 100 parts of the original unoxidized hydrocarbon mixture were mixed at room temperature and added in a slow stream into a jacketed reaction vessel equipped with an agitator. The vessel was heated with low pressure steam which heated the material and started an exothermic reaction which raised the material to a temperature which fluctuated between 100–105° C. Addition of the mixture was regulated so that the temperature was maintained between 100 and 105° C. throughout the addition period. After the entire mixture had been added to the reaction vessel, agitation at a temperature maintained between 100 and 105° C. was continued for 20 minutes. Upon discontinuing the agitation it was noted that there was no tendency for further temperature rise. (In cases where further temperature rise occurs, agitation with or without cooling is continued until the tendency to react further is eliminated.) The product so obtained was a stable liquid slightly less viscous than the untreated oxidized terpene material. Upon heating up to and slightly above 150° C. it was noted that no gas evolution or exothermic reaction occurred. The iodin liberation value of the product was negligible.

*Example 2*

A monocyclic terpene cut boiling above 170° C. and consisting chiefly of terpinolene, alpha-, beta- and gamma-terpinenes, dipentene, limonenes, menthenes, sabinene and 1–4 and 1–8 cineols was agitated by passing oxygen gas through the liquid fraction at a temperature maintained at 50° C. The oxidation was discontinued before capacity to absorb oxygen was completely satisfied. 400 parts of the unstable oxidized terpene product so obtained were slowly added to a steam jacketed reaction vessel of the type used in Example 1, and in the manner described in Example 1, regulating the rate of flow so that an approximately constant temperature of 110° C. was maintained throughout the stabilizing treatment. After the entire quantity had been introduced agitation and heat were continued for 20 minutes longer maintaining the temperature at 110° C. A stable product with no tendency to undergo exothermic reaction upon heating up to 150° C. and with a negligible iodin liberation value was obtained.

*Example 3*

An oxidized monocyclic terpene fraction of the type described in Example 1 was stabilized by heating a small portion with strong agitation in a jacketed reaction vessel. External heating was discontinued when the formation of heat within the mixture was shown by a sharp temperature rise. The temperature was held by cooling in the range 100–105° C. while continuously adding more unstable material in a small stream. The rate of addition was regulated to hold the temperature as specified. After all the unstable material had been added, the temperature was slowly raised to 125° C. over a period of twenty minutes and held there for an additional twenty minutes. The product was then cooled. It liberated only questionable traces of iodin from acidified sodium iodide solution.

The stabilized, oxidized, monocyclic terpene products obtained by the method in accordance with this invention are useful as solvents in paints and varnishes and may also be utilized to modify surface tension as detergent aids. Water-soluble portions are useful as softeners for paper, Cellophane, and other cellulose products.

What I claim and desire to protect by Letters Patent is:

1. A process for improving unstable oxidized monocyclic terpenes which comprises heating the said unstable oxidized terpenes to initiate an exothermic reaction, permitting the reaction to expend itself while controlling the temperature of the heated material between about 90° C. and about 140° C., and holding the material in the said temperature range until unstable components have been substantially eliminated.

2. A process for improving unstable oxidized monocyclic terpenes which comprises heating a portion of said unstable oxidized terpenes to initiate an exothermic reaction, obtaining a temperature between about 90° C. and about 140° C. in the oxidized terpenes, adding additional unstable oxidized terpenes at a rate permitting control of the temperature within the said range, and continuing the reaction until unstable components of the oxidized terpenes have been substantially eliminated.

3. A process for improving unstable oxidized monocyclic terpenes which comprises heating a mixture comprising the said unstable oxidized terpenes and an unsaturated terpene having at least one double bond capable of absorbing oxygen at a temperature between about 90° C. and about 140° C. until a stable terpenic mixture incapable of vigorous spontaneous exothermic reaction is formed.

4. A process for improving unstable oxidized monocyclic terpenes which comprises heating a mixture comprising the said unstable oxidized terpenes and an unsaturated terpene having at least one double bond capable of absorbing oxygen at a temperature between about 100° C. and about 120° C. until a stable terpenic mixture incapable of vigorous spontaneous exothermic reaction is formed.

5. A process for improving unstable oxidized monocyclic terpenes which comprises heating a portion of a mixture comprising the said unstable oxidized terpenes and an unsaturated terpene having at least one double bond capable of absorbing oxygen to a temperature in the range between about 90° C. and about 140° C. and adding increments of the said mixture at a rate which maintains the temperature within the said range and continuing the treatment within the said range until the resulting terpenic mixture is incapable of vigorous spontaneous exothermic reaction.

6. A process for improving unstable oxidized terpenic material resulting from the oxidation of a terpene fraction rich in terpinolene in the liquid phase by gaseous oxygen which comprises heating the said unstable oxidized material with an unsaturated terpene having at least one double bond capable of absorbing oxygen at a temperature between about 90° C. and about 140° C. until components capable of spontaneous exothermic reaction are substantially eliminated.

7. A process for improving unstable oxidized monocyclic terpenes which comprises heating a mixture comprising the said oxidized terpenes and a terpene fraction rich in terpinolene at a temperature between about 90° C. and about 140° C. until a stable terpenic mixture incapable of vigorous spontaneous exothermic reaction is formed.

8. A process for improving unstable oxidized terpenic material resulting from the oxidation of a terpene fraction rich in terpinolene in liquid phase with gaseous oxygen which comprises heating a mixture comprising the said unstable oxidized terpenic material and terpinolene at a temperature between about 90° C. and about 140° C. until a stable terpenic mixture incapable of vigorous spontaneous exothermic reaction is formed.

9. A process which comprises subjecting an unsaturated monocyclic terpene boiling above 170° C. to oxidation in the liquid phase with gaseous oxygen at a temperature below about 85° C. until an appreciable rise in specific gravity and in the weight of the terpene has occurred, but discontinuing the oxidation before the terpene becomes saturated with respect to oxygen, and then heating the resulting unstable oxidized product until a stable product incapable of spontaneous exothermic reaction is formed.

10. A process which comprises subjecting an unsaturated monocyclic terpene boiling above 170° C. to oxidation in the liquid phase with gaseous oxygen at a temperature below about 85° C. until an appreciable rise in specific gravity and in the weight of the terpene has occurred, but discontinuing the oxidation before the terpene becomes saturated with respect to oxygen, and then heating the resulting unstable oxidized product at a temperature between about 90° C. and about 140° C. until a stable product incapable of spontaneous exothermic reaction is formed.

11. A process which comprises subjecting an unsaturated monocyclic terpene boiling above 170° C. to oxidation in the liquid phase with gaseous oxygen at a temperature below about 85° C. until an appreciable rise in specific gravity and in the weight of the terpene has occurred, but discontinuing the oxidation before the terpene becomes saturated with respect to oxygen, and then heating a portion of the resulting unstable oxidized terpene to a temperature between about 90° C. and about 140° C., adding increments of the oxidized terpene to the heated portion at a rate which permits maintaining the temperature of the heated material within the said range, and maintaining the temperature of the material within the said range until it is incapable of spontaneous exothermic reaction.

12. A process for improving unstable oxidized monocyclic terpenes which comprises heating a portion of a mixture comprising the said unstable oxidized terpenes and an unsaturated terpene having at least one double bond capable of absorbing oxygen to a temperature in the range between about 100° C. and about 120° C. and adding increments of the said mixture at a rate which maintains the temperature within the said range and continuing the treatment within the said range until the resulting terpenic mixture is incapable of vigorous spontaneous exothermic reaction.

13. A process which comprises subjecting an unsaturated monocyclic terpene boiling above 170° C. to oxidation in the liquid phase with gaseous oxygen at a temperature below about 85° C. until an appreciable rise in specific gravity and in the weight of the terpene has occurred, but discontinuing the oxidation before the terpene becomes saturated with respect to oxygen, and then heating the resulting unstable oxidized product at a temperature between about 100° C. and about 120° C. until a stable product incapable of spontaneous exothermic reaction is formed.

EUGENE J. LORAND.